United States Patent
Chen et al.

(10) Patent No.: US 8,662,711 B2
(45) Date of Patent: Mar. 4, 2014

(54) OPTICAL REFLECTION PLATE AND LIGHTING DEVICE HAVING THE SAME

(75) Inventors: Sheng-Ping Chen, Kaohsiung (TW);
Chi-Cheng Cheng, Zhubei (TW);
Chun-Hung Liu, Kaohsiung (TW);
Shang-Jung Hsieh, Yuanshan Vil. (TW)

(73) Assignee: Lextar Electronics Corporation, Hsinchu (TW)

( * ) Notice: Subject to any disclaimer, the term of this patent is extended or adjusted under 35 U.S.C. 154(b) by 18 days.

(21) Appl. No.: 13/548,457

(22) Filed: Jul. 13, 2012

(65) Prior Publication Data
US 2013/0208468 A1 Aug. 15, 2013

(30) Foreign Application Priority Data
Feb. 15, 2012 (TW) .............................. 101104917 A

(51) Int. Cl.
*F21V 7/00* (2006.01)

(52) U.S. Cl.
USPC ........................... 362/302; 362/307; 362/346

(58) Field of Classification Search
USPC ......... 362/302, 307, 310, 346, 235, 341, 330; 359/530, 584
See application file for complete search history.

(56) References Cited

U.S. PATENT DOCUMENTS

| | | | | |
|---|---|---|---|---|
| 5,373,430 A * | 12/1994 | McDermott | .................. | 362/299 |
| 5,662,403 A | 9/1997 | Akashi et al. | | |
| 5,786,665 A * | 7/1998 | Ohtsuki et al. | ................ | 313/512 |
| 6,811,277 B2 * | 11/2004 | Amano | ......................... | 362/602 |
| 7,160,010 B1 * | 1/2007 | Chinniah et al. | .............. | 362/511 |
| 7,665,866 B2 * | 2/2010 | Mayer et al. | .................. | 362/297 |
| 2008/0247170 A1* | 10/2008 | Peck | ............................. | 362/297 |
| 2010/0142208 A1 | 6/2010 | Kokado et al. | | |
| 2011/0063835 A1 | 3/2011 | Rivas et al. | | |

FOREIGN PATENT DOCUMENTS

| | | |
|---|---|---|
| EP | 1826475 A1 | 8/2007 |
| TW | 1318710 | 12/2009 |
| TW | 1334950 | 12/2010 |
| TW | 201120344 | 6/2011 |
| TW | 1352180 | 11/2011 |

* cited by examiner

*Primary Examiner* — Peggy A. Neils
(74) *Attorney, Agent, or Firm* — Moser Taboada

(57) ABSTRACT

A lighting device is provided. The lighting device includes an optical reflection plate, a light holder, and at least one light source. The optical reflection plate includes a non-reflective region located in the center of the optical reflection plate, and a plurality of reflection regions surrounding the non-reflective region in sequence. The light holder is located on the non-reflective region of the optical reflection plate and includes a circle side-light concave portion. A light-emitting opening of the side-light concave portion faces to the reflection regions. The light source is located in the side-light concave portion of the light holder. When the light source emits light, the light emitted from the light source is reflected by the reflection regions.

8 Claims, 9 Drawing Sheets

OPTICAL REFLECTION PLATE AND LIGHTING DEVICE HAVING THE SAME

RELATED APPLICATIONS

This application claims priority to Taiwan Application Serial Number 101104917, filed Feb. 15, 2012, which is herein incorporated by reference.

BACKGROUND

1. Field of Invention

The present disclosure relates to an optical reflection plate and a lighting device having the same.

2. Description of Related Art

In daily life, lighting devices are indispensable tools. Conventional lighting devices include light bulbs or lamps which are used as the light sources therein. Fluorescent tubes, incandescent bulbs, or halogen light bulbs are typically used for such light bulbs or lamps. Since these light sources consume a lot of electrical energy when emitting light, lighting devices including light-emitting diodes (LED) as light sources have become more and more popular in recent years. In addition to low power consumption, an LED lighting device has a long life span, small size, is not easily affected by shaking movement (such as that encountered during an earthquake), can be used in many different applications, and also is not easily broken.

Regardless of the type of light source that is used in a lighting device, the light uniformity of the light emitted therefrom is very important for the eye comfort of users. For example, when the light uniformity of the light emitted from a lighting device is bad, an illuminated region (e.g., a desk) may have bright and dark regions. Viewing such an illuminated region easily leads to eye discomfort for users.

FIG. 1 is a perspective view of a conventional lighting device 100. The conventional lighting device 100 includes a housing 140, a light holder 120, a light source 122, a reflection plate 110, and a light transmissive plate 130. The light holder 120, the light source 122, and the reflection plate 110 are accommodated in the housing 140, and the light transmissive plate 130 is located on the housing 140 and corresponds to the position of the reflection plate 110 (i.e., is spaced apart from the reflection plate 110 at a location opposite to the same). The light source 122 is located on the light holder 120. When the light source 122 emits light, the light emitted from the light source 122 is reflected by the reflection plate 110. Thereafter, the light passes through the light transmissive plate 130. The reflection plate 110 causes the light emitted from the lighting device 100 to become uniform.

Nevertheless, although the light uniformity of the lighting device 100 can be improved by adjusting the angle and the position of the reflection plate 110, if the housing 140 and the reflection plate 110 of the lighting device 100 have been completely manufactured by molding, a uniform light-emitting surface is not easily adjusted due to the limited space of the lighting device 100. For example, the position of the reflection plate 110 fixed on the housing 140, and the shape and size of the reflection plate 110 are difficult to change.

SUMMARY

An aspect of the present invention is to provide an optical reflection plate.

In an embodiment of the present invention, an optical reflection plate includes a non-reflective region and a plurality of reflection regions. The non-reflective region is located in the center of the optical reflection plate. The reflection regions surround the non-reflective region in sequence.

In an embodiment of the present invention, the reflection parameters of the reflection regions are different.

In an embodiment of the present invention, each of the reflection regions comprises the reflection parameters of a light mirror reflectivity and a light scattering reflectivity.

In an embodiment of the present invention, the light mirror reflectivities of the reflection regions are gradually decreased in an outward direction away from the non-reflective region, and the light scattering reflectivities of the reflection regions are gradually increased in the outward direction away from the non-reflective region.

In an embodiment of the present invention, the reflection regions are formed using different materials, or are formed using the same material but through different surface treatment processes to thereby result in the reflection regions having different reflection parameters.

In an embodiment of the present invention, the reflection regions surround the non-reflective region in a concentric circle arrangement or in a concentric N-sided polygon-shaped arrangement, where N is a natural number more than or equal to 3.

In an embodiment of the present invention, the heights of the reflection regions are gradually inclinedly increased in an outward direction away from the non-reflective region.

An aspect of the present invention is to provide a lighting device including the aforementioned optical reflection plate.

In an embodiment of the present invention, the lighting device further includes a light holder and at least one light source. The light holder is located on the non-reflective region of the optical reflection plate. The light holder includes a circular side-light concave portion, and a light-emitting opening of the side-light concave portion faces the reflection regions. The light source is located in the side-light concave portion of the light holder. When the light source emits light, the light emitted from the light source is reflected by the reflection regions.

In an embodiment of the present invention, the lighting device further includes a diffusion plate located on the optical reflection plate and covering the reflection regions, such that the light reflected by the reflection regions is uniformly emitted out through the diffusion plate.

In an embodiment of the present invention, the optical reflection plate includes a through hole corresponding to the position of the light holder, and the light source is electrically connected to a power supply via the through hole.

In an embodiment of the present invention, the light source includes a light-emitting diode.

In the aforementioned embodiments of the present invention, since the reflection regions of the optical reflection plate surround the non-reflective region in sequence and the reflection parameters of the reflection regions are different, when the light source of the lighting device including the optical reflection plate emits light, the light emitted from the light source which is located in the side-light concave portion can be reflected by the reflection regions which include the different reflection parameters. Moreover, the light mirror reflectivities of the reflection regions are gradually decreased in the outward direction away from the non-reflective region, and the light scattering reflectivities of the reflection regions are gradually increased in the outward direction away from the non-reflective region. Such a design can improve the light-emitting uniformity of the lighting device.

Consequently, the light-emitting uniformity of the lighting device including the optical reflection plate does not need to be improved by adjusting the number or the position of the optical reflection plate. Even if the optical reflection plate has been completely manufactured by molding, the reflection regions including the different reflection parameters can be adjusted to provide a uniform light-emitting surface when the optical reflection plate is in a limited space. As a result, the material costs associated with manufacturing the optical reflection plate and the lighting device can be reduced.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
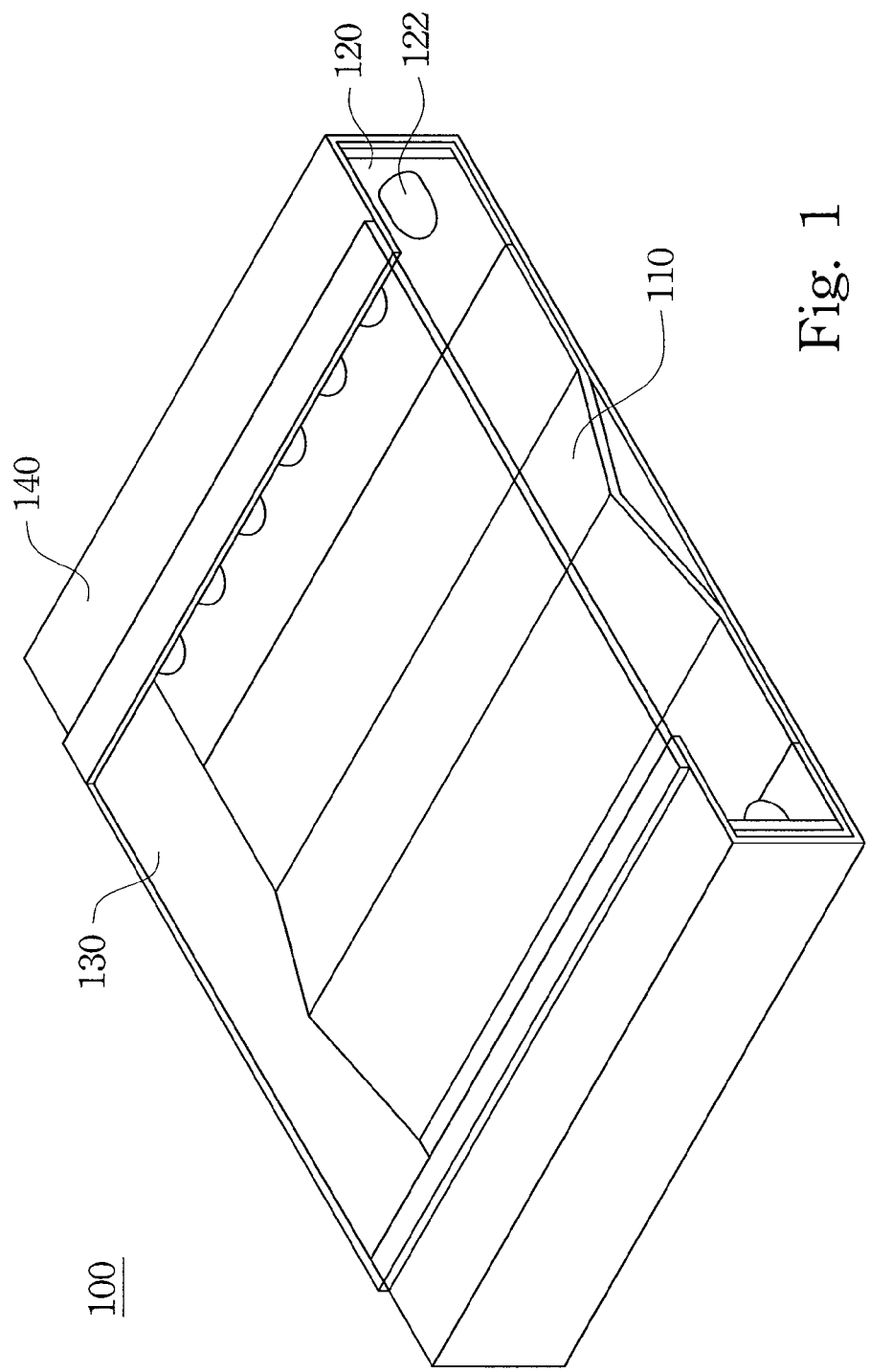
FIG. 1 is a perspective view of a conventional lighting device.
Figure 2:
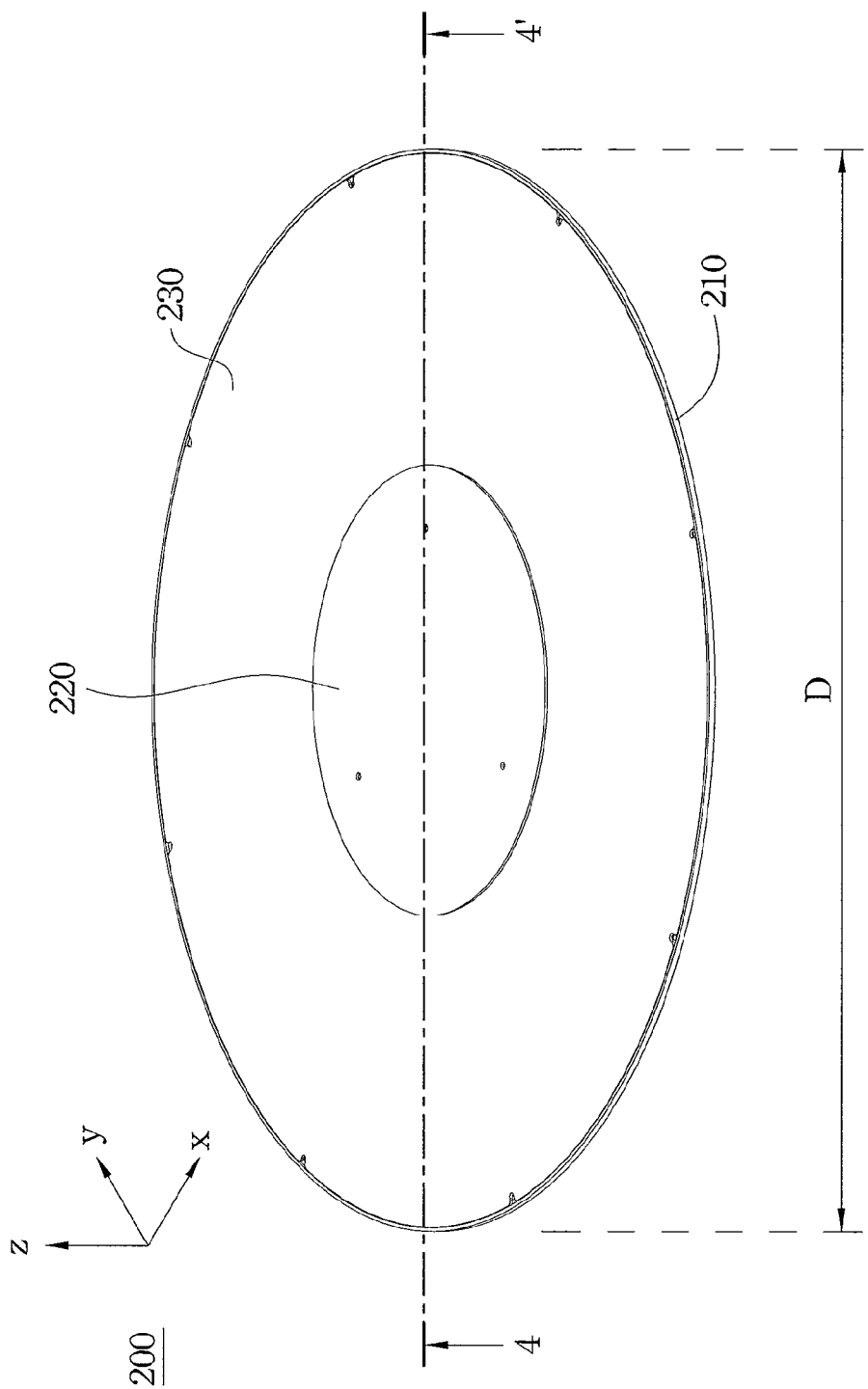
FIG. 2 is a perspective view of a lighting device of an embodiment of the present invention.

FIG. 2 is a perspective view of a lighting device 200 of an embodiment of the present invention. In this embodiment, the shape of the lighting device 200 is defined by an optical reflection plate 210, a light holder 220, and a diffusion plate 230. The diffusion plate 230 is a light-emitting surface of the lighting device 200, which can improve the light-emitting uniformity of the lighting device 200. The material of the optical reflection plate 210 may include aluminum. Each of the optical reflection plate 210, the light holder 220, and the diffusion plate 230 has a round cross section. However, in another embodiment, the optical reflection plate 210, the light holder 220, and the diffusion plate 230 may have cross sections in other shapes, and the present invention is not limited in this regard.

Figure 3:
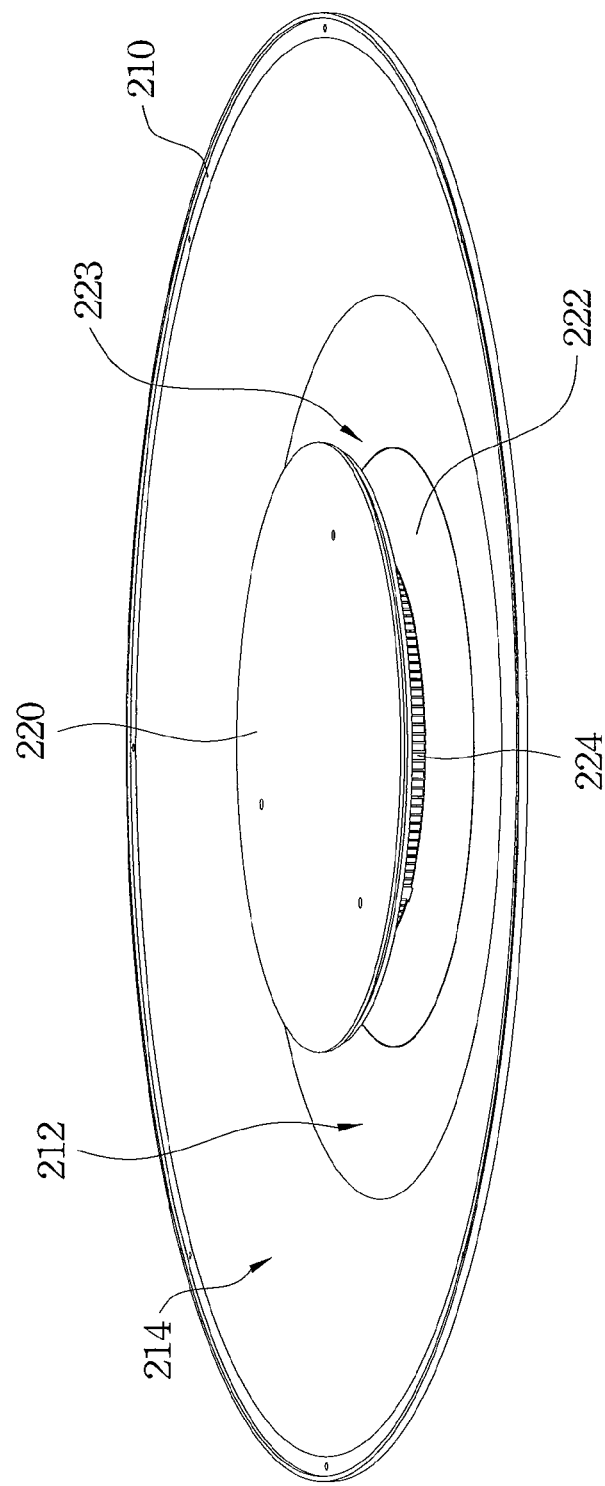
FIG. 3 is a perspective view of the lighting device shown in FIG. 2 when a diffusion plate is removed.
Figure 4:
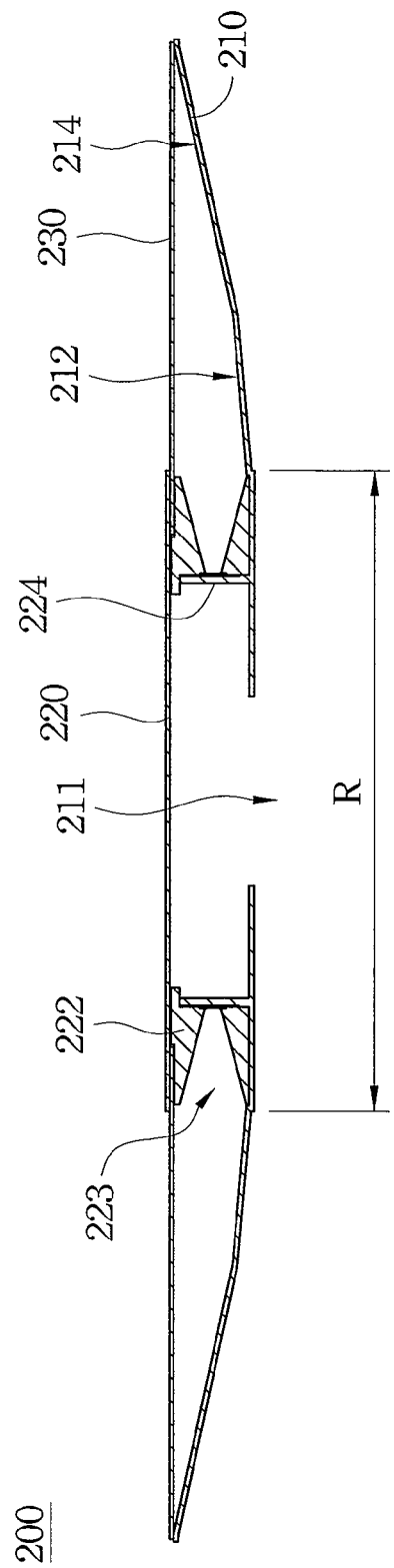
FIG. 4 is a cross sectional view of the lighting device shown in FIG. 2 taken along line 4-4'.

FIG. 3 is a perspective view of the lighting device 200 shown in FIG. 2 when the diffusion plate 230 is removed. FIG. 4 is a cross sectional view of the lighting device 200 shown in FIG. 2 taken along line 4-4'. As shown in FIG. 3 and FIG. 4, the lighting device 200 includes the optical reflection plate 210, the light holder 220, and a light source 224. The optical reflection plate 210 includes a non-reflective region R, a first reflection region 212, and a second reflection region 214. The non-reflective region R is located in the center of the optical reflection plate 210, and the light holder 220 is located on the non-reflective region R. The first and second reflection regions 212, 214 surround the non-reflective region R in sequence. That is, the first reflection region 212 is immediately adjacent to the non-reflective region R, and the second reflection region 214 is immediately adjacent to the first reflection region 212, with the first reflection region 212 interposed between the non-reflective region R and the second reflection region 214. The reflection parameters of the first reflection region 212 are different from the reflection parameters of the second reflection region 214. The reflection parameters of each of the first and second reflection regions 212, 214 include a light mirror reflectivity and a light scattering reflectivity.

In this embodiment, the first and second reflection regions 212, 214 surround the non-reflective region R in a concentric circle arrangement. The light mirror reflectivity of the first reflection region 212 is larger than the light mirror reflectivity of the second reflection region 214, and the light scattering reflectivity of the first reflection region 212 is smaller than the light scattering reflectivity of the second reflection region 214.

In another embodiment, the number of the reflection regions of the optical reflection plate 210 may be designed in accordance with practical requirements. That is, the number of the reflection regions is not limited two. However, regardless of the number of the reflection regions, it is necessary that the light mirror reflectivities of the reflection regions are gradually decreased in an outward direction away from the non-reflective region R, and that the light scattering reflectivities of the reflection regions are gradually increased in the outward direction away from the non-reflective region R.

Moreover, the light holder 220 includes a circular side-light concave portion 222 having a light-emitting opening 223. The light-emitting opening 223 of the side-light concave portion 222 faces the first and second reflection regions 212, 214. The light source 224 is located in the side-light concave portion 222 of the light holder 220. When the light source 224 emits light, the light emitted from the light source 224 is reflected by the first and second reflection regions 212, 214.

Furthermore, the lighting device 200 may optionally further include the diffusion plate 230. The diffusion plate 230 is located on the optical reflection plate 210 and covers the first and second reflection regions 212, 214, such that the light reflected by the first and second reflection regions 212, 214 is uniformly emitted out through the diffusion plate 230. In this embodiment, the light source 224 may include a light-emitting diode. In some embodiments, there are a plurality of the light sources 224 that are disposed around the light holder 220, and each of the light sources 224 is a light-emitting diode. The optical reflection plate 210 may include a through hole 211 corresponding to the position of the light holder 220, such that the light source 224 can be electrically connected to a power supply (not shown) via the through hole 211.

Since the first and second reflection regions 212, 214 of the optical reflection plate 210 surround the non-reflective region R in sequence and the reflection parameters of the first and second reflection regions 212, 214 are different, when the light source 224 of the lighting device 200 emits light, the light emitted from the light source 224 which is located in the side-light concave portion 222 can be reflected by the first and second reflection regions 212, 214 which include the different reflection parameters. As described above, the light mirror reflectivity of the first reflection region 212 is larger than the light mirror reflectivity of the second reflection region 214, and the light scattering reflectivity of the first reflection region 212 is smaller than the light scattering reflectivity of the second reflection region 214. Such a design can improve the light-emitting uniformity of the lighting device 200.

It is to be noted that the connection relationship of the aforementioned elements will not be repeated in the following description, and only aspects related to the forming method of the first and second reflection regions 212, 214 will be described.

Figure 5:
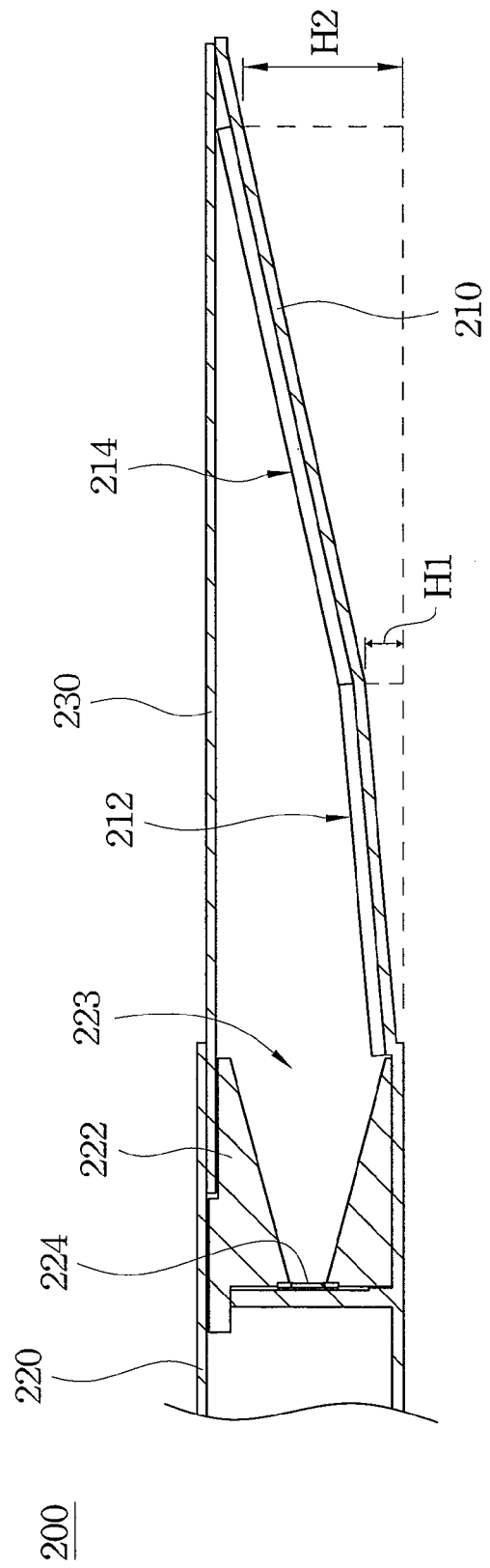
FIG. 5 is a partial enlarged view of the lighting device shown in FIG. 4.

FIG. 5 is a partial enlarged view of the lighting device 200 shown in FIG. 4. In this embodiment, the first and second reflection regions 212, 214 are formed by different materials, and the materials are formed on the optical reflection plate 210 by an adhering method or a coating method. For example, the first reflection region 212 may be a reflective sheet with a silver color, a film with a silver color, or a mirror. The second reflection region 214 may be a white baking varnish. As a result, the light mirror reflectivity of the first reflection region 212 is larger than the light mirror reflectivity of the second reflection region 214, and the light scattering reflectivity of the first reflection region 212 is smaller than the light scattering reflectivity of the second reflection region 214. In addition, the height H1 of the first reflection region 212 and the height H2 of the second reflection region 214 are gradually inclinedly increased in the outward direction away from the non-reflective region R (or away from the light holder 220). As shown in FIG. 5, the heights H1, H2 are measured starting from a base line that is substantially aligned with a bottom surface of the light holder 220.

Figure 6:
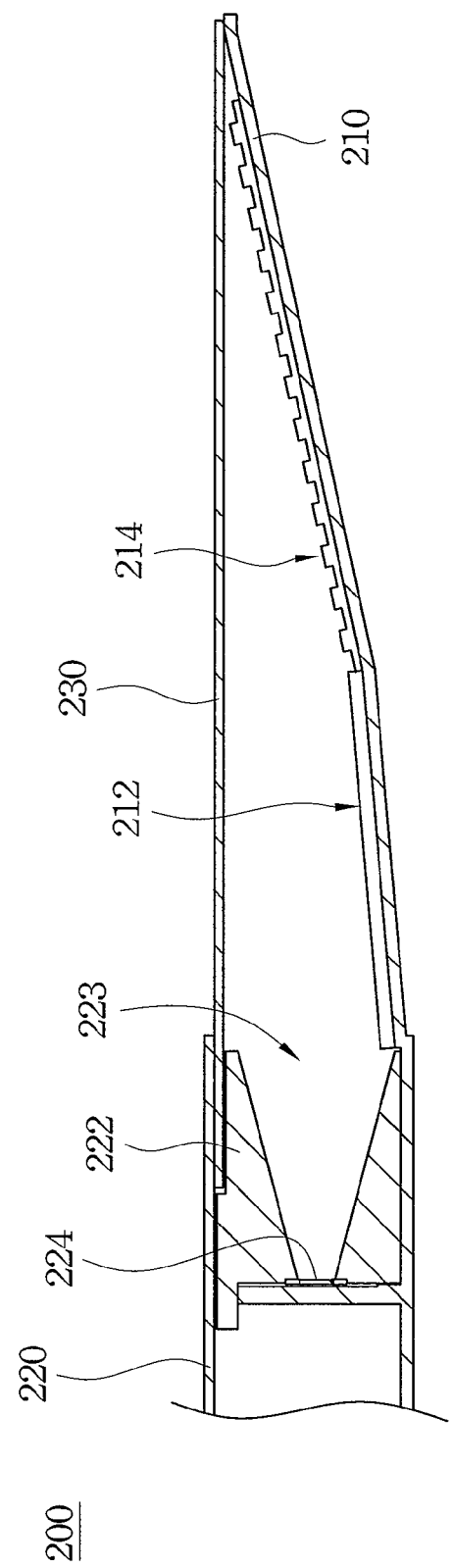
FIG. 6 is another embodiment of the lighting device shown in FIG. 5.

FIG. 6 is another embodiment of the lighting device 200 shown in FIG. 5. In this embodiment, the first and second reflection regions 212, 214 are formed using the same material but through different surface treatment processes to thereby result in the first and second reflection regions 212, 214 having different reflection parameters. For example, the first reflection region 212 may be formed using a polishing treatment process, while the second reflection region 214 may be formed using a texture treatment process, screen printing treatment process, or screen dot treatment process, such that the second reflection region 214 is rougher than the first reflection region 212. Consequently, the light mirror reflectivity of the first reflection region 212 is larger than the light mirror reflectivity of the second reflection region 214, and the light scattering reflectivity of the first reflection region 212 is smaller than the light scattering reflectivity of the second reflection region 214.

Figure 7:
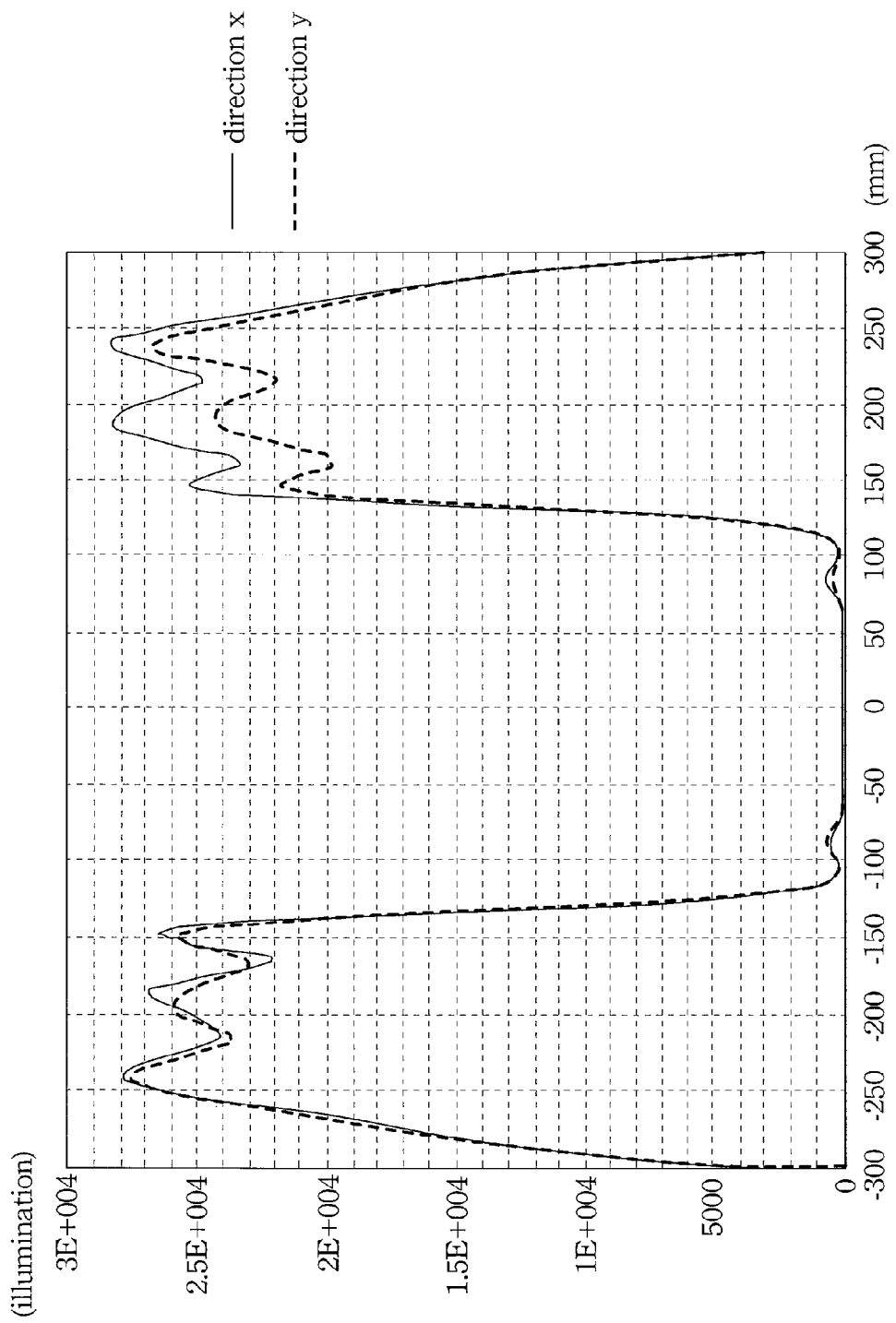
FIG. 7 is a diagram showing the relationship between illumination and position for the lighting device shown in FIG. 2.

FIG. 7 is a diagram showing the relationship between illumination and position for the lighting device 200 shown in FIG. 2. As shown in FIG. 2 and FIG. 7, the optical reflection plate 210 and the diffusion plate 230 have substantially the same diameter D. In this embodiment, the diameter D is about 600 mm. The solid line is the illumination measured in a direction x, and the dotted line is the illumination measured in a direction y. The measured data shown in FIG. 7 indicates that the diffusion plate 230 located between the edge of the light holder 220 and the edge of the optical reflection plate 210 produces good uniformity.

That is to say, the light-emitting uniformity of the lighting device 200 including the optical reflection plate 210 can be improved through use of simply the reflection regions 212, 214 which have different reflection parameters. Therefore, even if the optical reflection plate 210 has been completely manufactured by molding, the reflection regions 212, 214 including the different reflection parameters can be adjusted to provide a uniform light-emitting surface when the optical reflection plate 210 is in a limited space. As a result, the material costs associated with manufacturing the optical reflection plate 210 and the lighting device 200 can be reduced.

Figure 8:
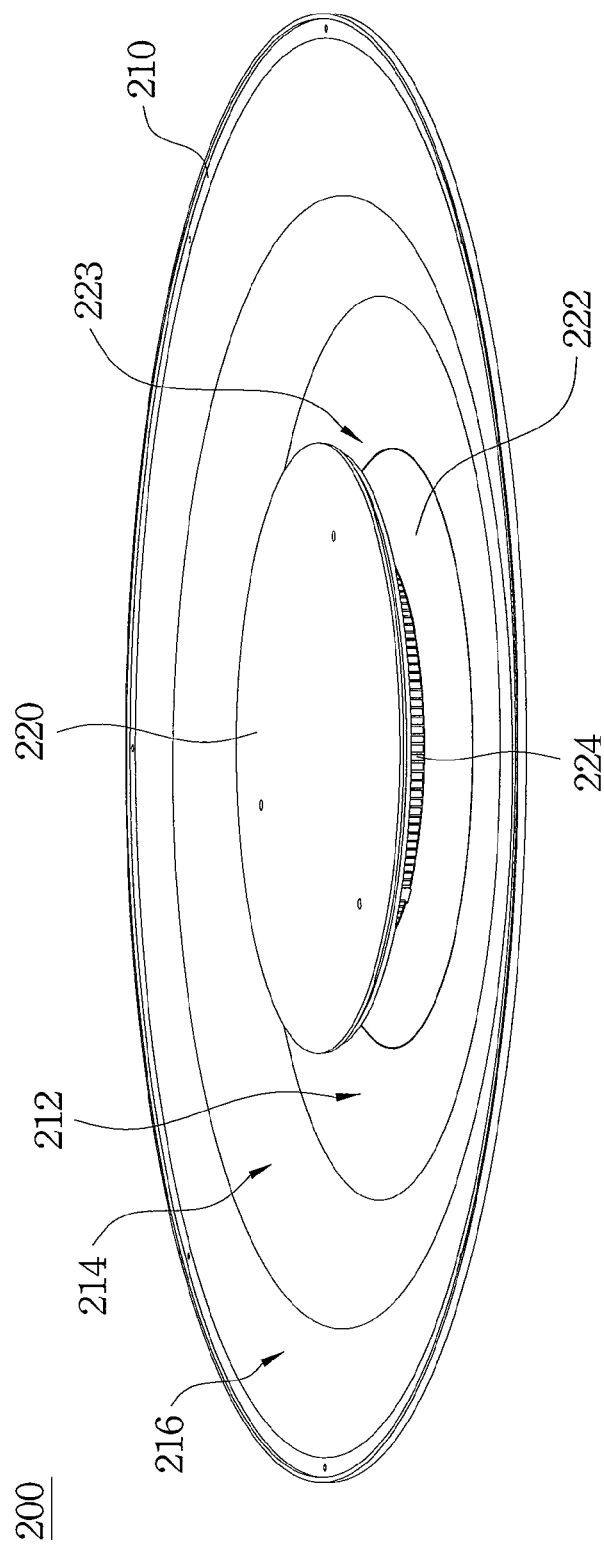
FIG. 8 is a perspective view of a lighting device of an embodiment of the present invention when a diffusion plate is removed.

FIG. 8 is a perspective view of a lighting device 200 of an embodiment of the present invention when a diffusion plate 230 (see FIG. 2) is removed. The difference between this embodiment and the embodiment shown in FIG. 2 is that the lighting device 200 includes a third reflection region 216 in addition to the first and second reflection regions 212, 214. The light mirror reflectivities of the first, the second, and the third reflection regions 212, 214, 216 are gradually decreased in sequence in the outward direction away from the non-reflective region R (i.e., away from the light holder 220), and the light scattering reflectivities of the first, the second, and the third reflection regions 212, 214, 216 are gradually increased in sequence in the outward direction away from the non-reflective region R (i.e., away from the light holder 220).

Figure 9:
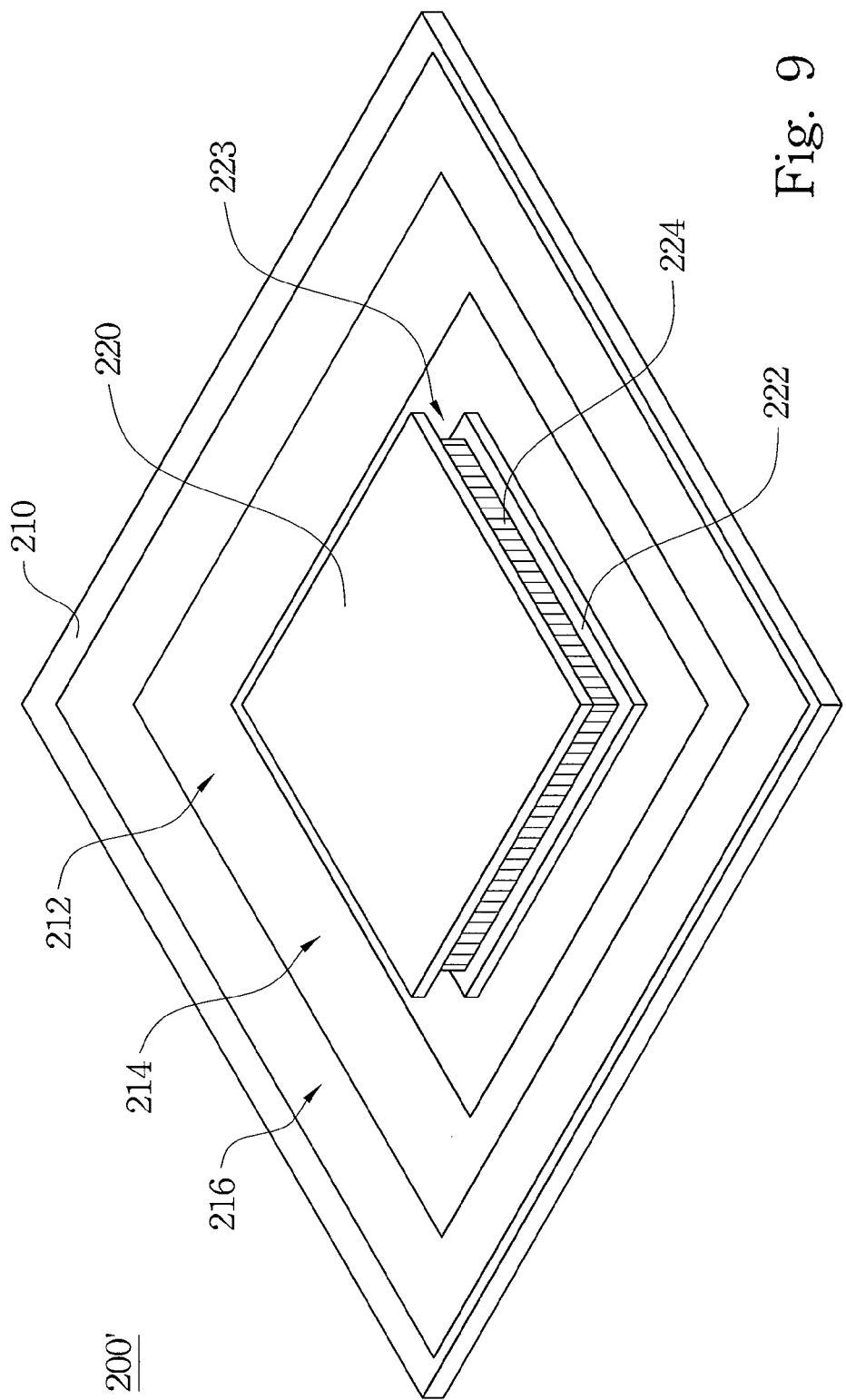
FIG. 9 is a perspective view of a lighting device of an embodiment of the present invention when a diffusion plate is removed.

FIG. 9 is a perspective view of a lighting device 200' of an embodiment of the present invention when a diffusion plate 230 (see FIG. 2) is removed. The difference between this embodiment and the embodiment shown in FIG. 8 is that the first, second, and third reflection regions 212, 214, 216 surround the non-reflective region R (i.e., the light holder 220) in a concentric four-sided polygon-shaped arrangement, and each of the optical reflection plate 210 and the lighting device 200 has a four-sided polygon shape.

Compared with a conventional lighting device, since the reflection regions of the optical reflection plate surround the non-reflective region in sequence and the reflection parameters of the reflection regions are different, when the light source of the lighting device including the optical reflection plate emits light, the light emitted from the light source which is located in the side-light concave portion can be reflected by the reflection regions which include the different reflection parameters. Moreover, the light mirror reflectivities of the reflection regions are gradually decreased in the outward direction away from the non-reflective region, and the light scattering reflectivities of the reflection regions are gradually increased in the outward direction away from the non-reflective region. Such a design can improve the light-emitting uniformity of the lighting device. Consequently, the light-emitting uniformity of the lighting device including the optical reflection plate does not need to be improved by adjusting the number or the position of the optical reflection plate. Even if the optical reflection plate has been completely manufactured by molding, the reflection regions including the different reflection parameters can be adjusted to provide a uniform light-emitting surface when the optical reflection plate is in a limited space. As a result, the material costs associated with manufacturing the optical reflection plate and the lighting device can be reduced.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An optical reflection plate comprising:
a non-reflective region located in the center of the optical reflection plate; and
a plurality of reflection regions surrounding the non-reflective region in sequence, wherein the reflection parameters of the reflection regions are different, each of the reflection regions comprises the reflection parameters of a light mirror reflectivity and a light scattering reflectivity, the light mirror reflectivities of the reflection regions are gradually decreased in an outward direction away from the non-reflective region, and the light scattering reflectivities of the reflection regions are gradually increased in the outward direction away from the non-reflective region.

2. The optical reflection plate as claimed in claim 1, wherein the reflection regions are formed using different materials, or are formed using the same material but through different surface treatment processes to thereby result in the reflection regions having different reflection parameters.

3. The optical reflection plate as claimed in claim 1, wherein the reflection regions surround the non-reflective region in a concentric circle arrangement or in a concentric N-sided polygon-shaped arrangement, where N is a natural number more than or equal to 3.

4. The optical reflection plate as claimed in claim 1, wherein the heights of the reflection regions are gradually inclinedly increased in an outward direction away from the non-reflective region.

5. A lighting device comprising the optical reflection plate as claimed in claim 1, wherein the lighting device further comprises:

a light holder disposed on the non-reflective region of the optical reflection plate, wherein the light holder comprises a circular side-light concave portion, and a light-emitting opening of the side-light concave portion faces the reflection regions; and at least one light source disposed in the side-light concave portion of the light holder, wherein when the light source emits light, the light emitted from the light source is reflected by the reflection regions.

6. The lighting device as claimed in claim 5, further comprising:

a diffusion plate located on the optical reflection plate and covering the reflection regions, such that the light reflected by the reflection regions is uniformly emitted out through the diffusion plate.

7. The lighting device as claimed in claim 5, wherein the optical reflection plate comprises a through hole corresponding to the position of the light holder, and the light source is electrically connected to a power supply via the through hole.

8. The lighting device as claimed in claim 5, wherein the light source comprises a light-emitting diode.

* * * * *